US006941573B1

(12) United States Patent
Cowan et al.

(10) Patent No.: US 6,941,573 B1
(45) Date of Patent: *Sep. 6, 2005

(54) TELEVISION DISTRIBUTION SYSTEM FOR SIGNAL SUBSTITUTION

(75) Inventors: Thomas M. Cowan, Dundee, IL (US); Scott J. Thomas, Glenview, IL (US); Bruce C. Richardson, Harvard, IL (US)

(73) Assignee: Information Resources, Inc., Chicago, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/821,890

(22) Filed: Mar. 21, 1997

Related U.S. Application Data

(63) Continuation-in-part of application No. 08/693,953, filed on Aug. 7, 1996, now abandoned.

(51) Int. Cl.⁷ .......................... H04N 9/00; H04N 7/16
(52) U.S. Cl. ................. 725/9; 725/35; 704/14
(58) Field of Search .................. 348/200.47, 9, 348/1, 2, 3, 6–8, 11, 12; 455/2, 3.1, 3.2, 4.1, 455/4.2, 5.1, 6.1, 6.2; 395/200.49; 725/9, 725/11, 12, 16, 32, 35, 118, 148; 705/14; H04N 9/00, H04N 7/16, 7/025, 7/10

(56) References Cited

U.S. PATENT DOCUMENTS

| 3,312,900 A | 4/1967 | Jaffe ......................... 325/31 |
| 3,366,731 A | 1/1968 | Wallerstein .................... 178/6 |
| 3,639,686 A | 2/1972 | Walker et al. ........... 178/5.8 R |
| 3,714,575 A | 1/1973 | Rogalski ..................... 325/53 |
| 3,789,131 A | 1/1974 | Harney et al. ............... 178/5.1 |
| 3,864,636 A | 2/1975 | Fukuda et al. .............. 325/421 |
| 3,899,633 A | 8/1975 | Sorenson et al. ............ 178/5.1 |
| 3,934,079 A | 1/1976 | Barnhart ..................... 178/5.1 |
| 3,935,534 A | 1/1976 | Lewis et al. ................. 325/308 |
| 3,975,583 A | 8/1976 | Meadows .................... 178/5.6 |
| 3,997,718 A | 12/1976 | Ricketts et al. .............. 178/6.8 |
| 4,020,419 A | 4/1977 | Caspari et al. .............. 325/421 |
| 4,035,838 A | 7/1977 | Bassani et al. ............... 358/86 |
| 4,044,376 A | 8/1977 | Porter ........................ 358/84 |
| 4,058,829 A | 11/1977 | Thompson ................... 358/84 |
| 4,216,497 A | 8/1980 | Ishman et al. ................ 358/84 |
| 4,272,729 A | 6/1981 | Riley, Jr. ........................ 331/1 |
| 4,329,675 A | 5/1982 | Van Hulle .................... 358/86 |
| 4,331,973 A | 5/1982 | Eskin et al. .................. 358/84 |
| 4,331,974 A | 5/1982 | Cogswell et al. ............. 358/86 |
| 4,425,578 A | 1/1984 | Haselwood et al. .......... 358/84 |
| 4,577,220 A | 3/1986 | Laxton et al. ................ 358/84 |

(Continued)

FOREIGN PATENT DOCUMENTS

GB        2 052 196 A     1/1981       ............ H03D 1/22

*Primary Examiner*—Vivek Srivatava
(74) *Attorney, Agent, or Firm*—Fitch, Even, Tabin & Flannery (57) ABSTRACT

A cable television distribution system in which the head end substitutes different channels for a plurality of separated geographic zones. The head end creates a plurality of channel spectrums and transmits the spectrums on distribution trunks such that a different spectrum may be present on each distribution trunk. The spectrums on the distribution trunks are connected to zones of the viewer community which have been selected for market research purposes on the basis of demographics. Product sales collection units are provided at stores throughout the community served by the cable television distribution to collect consumer purchase data for market research purposes.

24 Claims, 7 Drawing Sheets

U.S. PATENT DOCUMENTS

| | | | |
|---|---|---|---|
| 4,622,583 A | 11/1986 | Watanabe et al. | 358/84 |
| 4,630,108 A | 12/1986 | Gomersall | 358/84 |
| 4,633,315 A | 12/1986 | Kasperkovitz | 358/188 |
| 4,723,302 A | 2/1988 | Fulmer et al. | 455/2 |
| 4,733,301 A | 3/1988 | Wright, Jr. | 358/181 |
| 4,736,390 A | 4/1988 | Ward et al. | 375/75 |
| 4,783,843 A | 11/1988 | Leff et al. | 455/12 |
| 4,789,897 A | 12/1988 | Kappeler et al. | 358/188 |
| 4,847,685 A | 7/1989 | Gall et al. | 358/84 |
| 4,876,592 A * | 10/1989 | Von Kohorn | 358/84 |
| 4,876,736 A | 10/1989 | Kiewit | 455/2 |
| 4,878,245 A | 10/1989 | Bradley et al. | 380/10 |
| 4,885,632 A | 12/1989 | Mabey et al. | 358/84 |
| 4,929,905 A | 5/1990 | Ruitenburg | 329/358 |
| 4,972,504 A | 11/1990 | Daniel, Jr. et al. | 455/2 |
| 4,974,085 A | 11/1990 | Campbell et al. | 358/181 |
| 5,055,924 A | 10/1991 | Skutta | 358/84 |
| RE33,808 E | 1/1992 | Wright, Jr. | 358/86 |
| 5,155,591 A | 10/1992 | Wachob | 358/86 |
| 5,231,494 A | 7/1993 | Wachob | 358/146 |
| 5,389,964 A | 2/1995 | Oberle et al. | 348/9 |
| 5,490,060 A * | 2/1996 | Malec et al. | 364/401 |
| 5,661,516 A * | 8/1997 | Carles | 348/8 |

* cited by examiner

TELEVISION DISTRIBUTION SYSTEM FOR SIGNAL SUBSTITUTION

CROSS-REFERENCE TO RELATED APPLICATIONS

This application is a continuation-in-part of U.S. patent application Ser. No. 08/693,953, filed Aug. 7, 1996, now abandoned.

BACKGROUND OF THE INVENTION

This invention relates generally to the accumulation of consumer response information and more particularly to the presentation of selected information to viewers of targeted television programming and the accumulation of responses from those viewers.

Conventional market research has involved subjecting selected groups of consumers to particular promotional material and observing their responses. There have, however, been difficulties peculiar to the exposing of the selected group to particular promotional material as well as problems peculiar to measuring their responses. A particular problem is that the method of exposure of the selected group to the promotional material or the collection of the responses may skew the results; that is, the testing itself may influence the results independently of the material being tested. More particularly, in respect to the dissemination of television advertisements, if the panelists know they are receiving special promotional material, they may react differently than were they to believe they are receiving normal promotional material. Further, the participating panelists must be divided into a control group and a test group receiving alternative material, and it is important that these groups be split so that the control and test groups are matched on relevant statistics.

In respect to television advertising, one approach has been to use cable television with a split cable as illustrated by U.S. Pat. No. 3,366,731, issued Jan. 30, 1968 to Edward Wallerstein for Television Distribution System Permitting Program Substitution for Selected Viewers. In such a split cable system two cables originating from a single transmitting source go out in different directions. One advertisement is inserted on one cable and another advertisement on another cable. A problem that has developed with this is that the split of the cable produces control and test groups that are not properly matched for market testing. This is, the two cables are directed to different neighborhoods at the whim of the cable television company, whereas the needs of market research are more particular. It has been known to provide two cables side by side, so that both cables serve the same neighborhoods and are, therefore, likely to provide a better match of control groups to test groups. However, even here there is a problem that once the cables are laid the cables themselves select the groups; that is the television viewers are either on cable A or on cable B and do not admit of special selection to meet the needs of a particular market test.

Another television market research system is shown in U.S. Pat. No. 4,331,973 issued May 25, 1982 to Eskin et al. With the Eskin et al. system, a substantially identical spectrum of television channels is provided to all potential viewers. Some channels of the spectrum are used to convey possible substitute signals which are not accessible to most viewers. The panelists of the system are given uniquely addressable panelist receiving stations. When panelists are to receive substitute signals, the unique addresses of their respective receiving stations are sent out to control the receiving stations to tune to the substitute signals in place of the normal signals that others will watch.

The Eskin et al. system allows a different combination of panelists to be selected for each program substitution and has provided valuable marketing information. The system, however, requires great expense in providing and maintaining sophisticated receiving stations in each panelist household. Also, panelists at times resist the requirement for such receiving stations in addition to their VCRs and cable television distribution and decoder boxes which already connect to their televisions.

A need exists for a market research signal substitution system which accurately represents the demographics of the community being served and which avoids the problems, costs and user resistance of an individually addressed arrangement.

SUMMARY OF THE INVENTION

In accordance with the present invention, the target community is divided into a significant plurality of zones of coverage. In the disclosed exemplary embodiment the number of zones is 24. The cable head end produces a small plurality of distribution trunks conveying normal and substitute channel signals in a cable television distribution spectrum. Each distribution trunk is split into a plurality of cable television signal feeds which convey substantially identical signals to their source distribution trunk. Each zone receives a cable television feed signal from the cable television head end, which feed signal is distributed to the viewer households of its respective zone. The market research firm, prior to connection of feed signals to the zones, determines from information provided by volunteer members of the community, which combination of zones throughout the community will demographically reflect the community as a whole or reflect a desirable attribute of the community. Based on such a determination the zones are selected and connected by cable signal feeds to one of the distribution trunks of the cable head end. The cable television head end equipment, in conjunction with equipment provided by the market research firm, from time to time produces at least one distribution trunk television signal spectrum having at least one substitute channel signal and at least one distribution trunk television signal spectrum having channel signals not including the substitute channel signal. Based on the predetermined connection of distribution trunks to zones via the signal feeds, a normal spectrum is distributed to some zones while a substituted spectrum may be delivered to other zones. In one embodiment, a market research computer system stores the associations of consumers with the particular distribution trunks from which each consumer's household receives signals and analyzes consumer's shopping behavior based on the signals presented to the zones.

In one market analysis embodiment, panelists are solicited from the community and each panelist in the study is assigned a panelist identification which may be in the form of a panelist identity card. When a panelist purchases goods, the panelist identification is associated with the information identifying the goods purchased and forwarded to a market research computer system. A market research firm collects the associated panelist-purchased goods information in the market research computer system which has previously been informed of which panelists are served by which zones and which zones have been provided a television spectrum signal feed including normal and substitute channel spectrums. Marketing information can then be generated based on the purchases of panelists which did and did not receive the substitute channel programming.

The panelist responses may be obtained without any conscious action by the panelists. More particularly, in one embodiment all the panelists need do is provide initial demographic data and to identify themselves at the time of purchase of products. Otherwise they act entirely in accordance with their usual practices. Such identification might occur, for example, when the panelist uses his or her credit card for the purchase. More particularly, for grocery products at least, universal product coding (UPC) has become common. In accordance with one embodiment of the present invention, each panelist is provided with a panelist identification card having a scannable identification thereon which is recorded in a market research computer system to correspond with the particular cable signal feed and thus which programming the panelist has reviewed. The identification card is presented to the cooperating retail stores where he or she shops, where the card is scanned by a UPC product scanner along with the scanning of purchased products. The work load of the panelist is reduced merely to presenting his identification card. Data capture is electronic and automatic, both for the product and for the panelist identification. The panelist never needs to record anything because all data are recorded by the UPC scanner. The information obtained by the scanner is transmitted by the retail store to a market research computer system for association and correlation of the data with the advertisements sent out to the respective panelists. That is, the signals transmitted to the respective panelists are identified as the signals sent out by the cable television head end, and the responses of the respective panelists are noted by the scanning units of retail stores and transmitted back to the market research computer for association and correlation.

For best association and correlation it is helpful to have an area blanketed with UPC scanners connected to the system. For example, if all of the grocery outlets, or substantially all, in a given geographical area near the panelists are provided with UPC scanners connected to the market research computer, substantially all grocery products purchased by the respective panelists are accounted for. In general, the retailers have substantially no adjustment to make beyond normal scanning, except for scanning panelist identification cards.

A second embodiment of panelist purchase data collection may also be employed. In the second embodiment, the panelists regularly report to the marketing research computer system their panelist identification and data regarding the purchases they have made. For example, a panelist may be provided with a home UPC scanner which is used to record recent purchases. The purchase information and the panelist identity are stored in the home UPC scanner and transmitted to the market research computer system where they can be analyzed in the same manner as the retail store collected data. Many possible ways of data collection may be employed with the present system provided that the panelist identity and the products purchased are matched before market research analysis.

It is an object of the above embodiment to provide panelist response scanning by the combination of a targetable television system for directing specific messages to groups of panelists in zones of the community, a plurality of panelist identification means for identifying respective panelists, data collection arrangements for identifying the products purchased by respective panelists, and market research computer system for receiving the information from the plurality of product data collection arrangements to provide such automatic indication of panelist behavior.

The system of the above embodiments provides results drawn from selections of panelists in the community as a whole and does not merely represent an unscientifically selected one-half of the community as does the Wallerstein arrangement and does not require the expense and complications of the per-panelist-directed system of Eskin et al.

The preceding embodiments for consumer data collection and analysis work well in many instances, however, they require active participation on the part of the consumers/panelists. Such participation may affect the actions of the consumers and, importantly, many cause members of the public not to participate in the study. For example, some people simply may not want to disclose the information required to become a panelist.

A third embodiment of the invention uses the consumer community at large as subjects of consumer analysis when normal and substitute programs are presented on the television receiver of a community. In the third embodiment, normal and substitute signals are distributed to separated zones of the community as with the preceding embodiments. Based on consumer demographics and the distribution of stores in each zone, particular stores are selected to be representative of the community. The stores selected are those in which the shoppers are preponderantly from the same zone. Such a selection may be made based, for example, on the demographic data provided by a sample of the consumers themselves and/or it may be made based on a fixed perimeter drawn around the stores. Once the stores, and their included consumer information collection systems are identified, data associating particular stores with particular zones is then recorded in the market research computer. When a test is performed in which substitute advertising is transmitted to particular zones, the consumer purchase data from the selected stores of the market study area is collected. The significance of the substitute advertising can then be determined by comparing consumer purchase data collected from selected stores associated with zones receiving the substitute advertising with consumer data collected from selected stores associated with zones receiving normal advertising. Additionally, particular types of stores selected on the basis of store demographics in the different zones can be compared to determine possible differences in shopping behavior based on the type of store selected. For example, when the normal and substitute advertising is directed at the relatively affluent, the purchase data from upscale stores in zones receiving different advertising can be compared. Similar store type selection may also prove advantageous for more common consumer purchases such as those made at discount stores.

Some consumer behavior is difficult to measure by the use of data collection points in stores because the consumers' responses may not require leaving their homes or because too few stores of an appropriate type exist in the community. For example, a marketing test may run normal and substitute advertisements for a telephone service which is purchased by a phone call, i.e., no attendance at a store data collection point is required.

To collect and analyze data in the above situation, the market researchers identify a consumer parameter for the consumers/viewers of the community and associate that parameter with one of the zones. For example, the consumer telephone numbers, with the zone including each number, may be recorded in a market research computer. After running a normal/substitute programming test, a person-on-the-street or telephone survey may be conducted in the community to identify the consumers' phone numbers and their purchase behaviors. When the survey data is analyzed, a stored data file associating phone numbers with zones is used to identify the zone associated with each responding consumer so that statistical analysis of consumer behavior can be completed.

In the present discussion, the term "panelist" is used to represent the individuals in a particular household. The term "normal" is used herein to signify the messages, signals or programs provided by the operation of the television system in the absence of the substitution provided by the present invention. It thus may encompass all messages, signals or programs as may be provided in the normal course of television programming, including special messages, signals or programs transmitted and received over the usual channels to which the receivers are ordinarily tunable. The term "program" encompasses commercials and other special messages.

DETAILED DESCRIPTION

Figure 1:
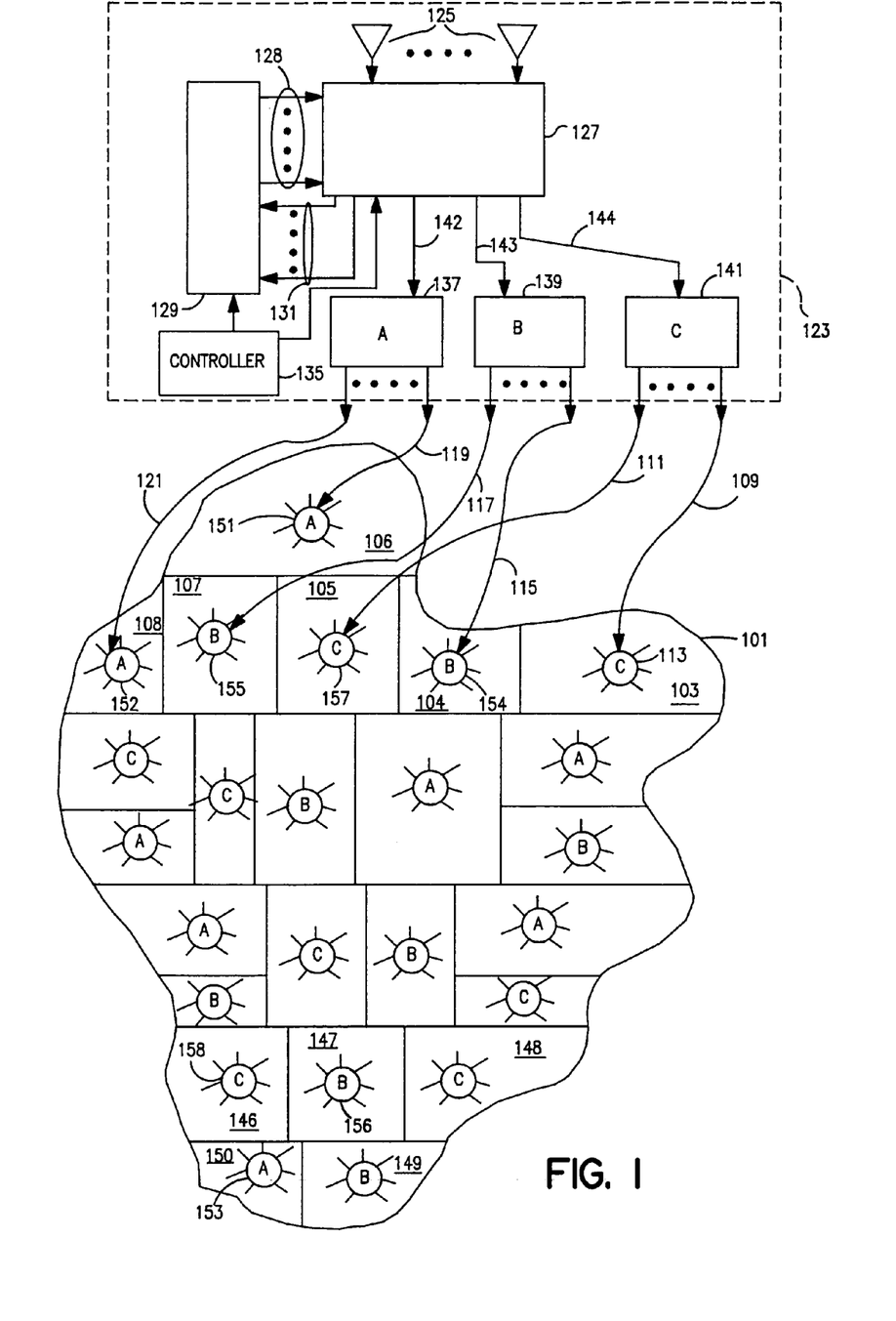
FIG. 1 is a general block diagram showing a cable television head end constructed to deliver cable television signals, including substitute signals to a community divided into zones.

FIG. 1 is a general block diagram showing a targeted television system in accordance with the present invention for delivering cable television signals to a viewer community represented by irregular area 101. Twenty-four zones, of which only zones 103 through 108 have been numbered, make up the community. Each of the zones represents an area of the community in which the cable television subscribers are served from a single cable feed such as cable feeds 109 and 111. The zones will not be as regular as shown because they are determined by the cable television company based on the economics of providing cable services. Each zone, however, includes a number of geographically proximate subscribers and is referred to herein as being substantially contiguous. Further, it is possible that over time the zone boundaries will change as new subscribers request cable service and other subscribers give up their prior service.

Figure 3:
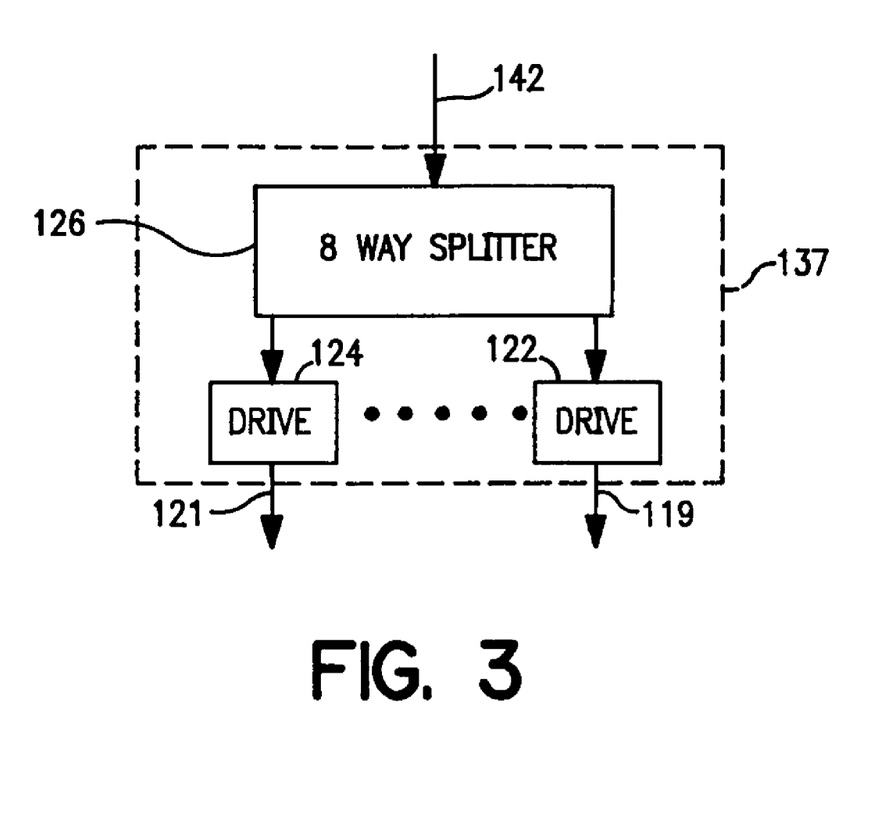
FIG. 3, shows an rf cable splitter and a plurality of fiber optic drivers.

Each zone, e.g. 103, includes a signal distribution point such as 113 which receives the cable feed, e.g. 109 and distributes the cable TV spectrum of the cable feed by means well known in the art to the viewers in the zone. The spectrum of signals on a cable feed, e.g. 109, is provided by a cable head end 123. Cable head end 123 includes a plurality of signal inputs 125 for receiving the normal TV channels from over-the-air broadcasts or satellites. It should be mentioned that the normal channels may also include programming which is provided by the cable TV operator, such as video tapes of community events. The sources of normal signals, e.g., 125, are signal inputs to a television channel connection apparatus 127, as are a plurality of input signals 128 from a substitute channel signal source 129. In addition, the channel connector 127 provides a plurality of normal TV channels to the substitute signal source 129 over a plurality of connections 131. Substitute signal source 129 and connection apparatus 127 cooperate under the control of a computerized controller 135 to produce television signals for three distribution trunks 142, 143 and 144. Each of the distribution trunks 142, 143 and 144 conveys a full spectrum of cable TV channels to a respective splitter/driver 137 which includes an 8-way signal splitter 126 and cable feed drivers, e.g. 122, 124 (FIG. 3). By the operation of substitute signal source 129, connector apparatus 127 and controller 135, the television channel signals may be different on each of the distribution trunks 142, 143 and 144, so that the feeder cables 119 and 121 may be carrying normal and substitute channels while the feeder cables 117 and 115 of splitter/driver 139 and the feeder cables of splitter/driver 141 may convey only normal channels.

When a market research firm begins business in a community, the population is solicited to identify cable television subscribers who volunteer to provide demographic data. Such volunteers provide the market researcher with demographic data comprising information about various types of personal and shopping behaviors. For example, the volunteers may disclose the names and ages of individuals in the panelist's household, household income and likes and dislikes, as well as, the stores frequently shopped and the brands frequently purchased. Based on the consumer-provided information, the market researcher determines which of the zones, e.g. 103–108, should be connected to which of the splitter/drivers 137, 139 and 141. The goal is to demographically select the interconnection between distribution trunks and zones so that each distribution trunk is connected to a "cross section" of the panelists in the community. For ease of understanding, not all 24 feed cables from splitter/drivers 137, 139 and 141 to zones have been shown. Instead, the signal distribution point, e.g., 113, of each zone has been given a letter A, B or C which corresponds to the A, B or C letter assigned to the splitter/driver connected thereto. In FIG. 1, all 8 of the zones having a signal distribution point labeled A, e.g., 151, 152 and 153, are connected to splitter/driver 137, all 8 distribution, points labeled B, e.g., 154, 155 and 156, are connected to splitter/driver 139 and all distribution points labeled C are connected to splitter/driver 141. The described method of selecting interconnection permits a demographic selection of a test group, e.g. A, for a new (substitute) advertisement, while another group, e.g., B, can be selected as a control group which receives normal signals rather than the new substitute advertisement.

Some of the volunteer subscribers may also volunteer to be panelists which are employed in a specific type of market analysis. The panelists are given panelist identity cards which they present at the stores of the community to identify their purchases as having been made by specific individuals. The panelist data and demographics can later be used in the analysis of panelist specific responses. It is significant to note, however, that all subscribers/consumers in a zone receive the same spectrum of signals from the head end so that data collected from all subscribers, not just panelists, can be analyzed as described later herein.

The connection apparatus 127 receives all channels of normal signals and substitute channel signals and combines the received channel signals onto the three distribution trunks 142, 143 and 144. In the present embodiment each cable subscriber receives a spectrum of up to 60 different channels on the cable at their household. During normal distribution the channel signals from receivers 125 are properly channel modulated and combined as a distribution channel spectrum on all three distribution trunks 142, 143 and 144 such that all three trunks convey the same signals. Each of the distribution trunks 142, 143 and 144 feeds an associated eight-way splitter/driver 137, 139 and 141. The splitter/drivers, e.g., 137, comprise an eight-way rf splitter 126, each output of which feeds a fiber optic driver 122, 124. The output signals of the splitter/drivers are then conveyed to connected distribution points, e.g. 151 and 152, via feeder cables 119 and 121. The distribution points convert the optical channel information back to rf for distribution to the subscribers in the zone. It should be mentioned that at least two distribution trunks and splitter/drivers are used so that a test group and a control group can be created. While the present embodiment uses three distribution trunks, some panelist response testing systems may use four or more distribution trunks and splitter/drivers. Also, the present embodiment uses fiber optic feeder cables; however, other types of feeder cables, such as rf coaxial cable, could be used.

When a new advertisement is to be tested it is installed at substitute signal source 129 and made available on a lead 128 as an input to the connection apparatus 127. Under the control of controller 135 connection apparatus 127 replaces normal signals in a channel on one of the distribution trunks 142, 143 and 144 with the new advertisement. When the substitution is made for distribution trunk 142, the substitute signal is delivered to all subscribers, including all panelists, in zones A. Thus the subscribers in zones A may be the test group and the subscribers in either zones B or zones C, which do not receive the new advertisement, may be chosen as a control group.

Figure 2:
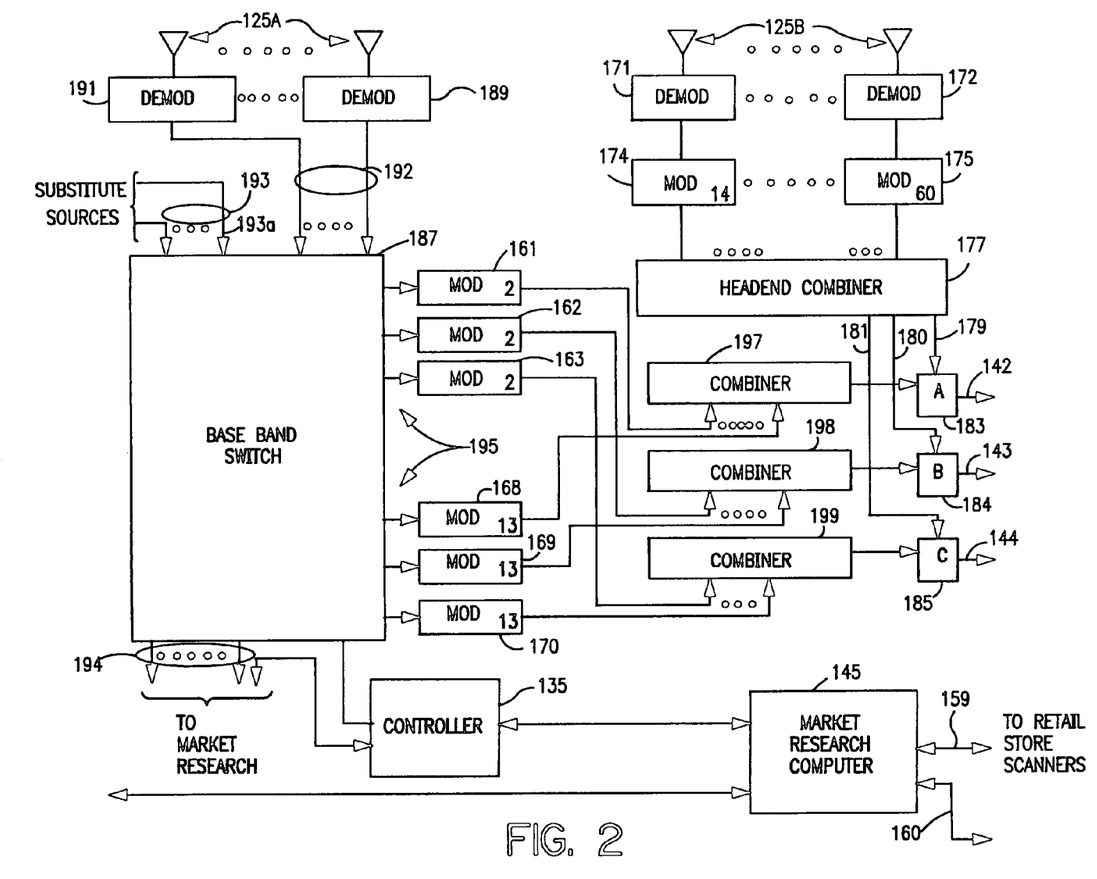
FIG. 2 is a block diagram of a first embodiment of a cable television head end.

FIG. 2 shows an embodiment of a cable head end which is equipped to provide channel substitution in the manner described above for a 60 channel distribution system. With the present embodiment twelve channels may be subject to signal substitution, while the remaining 48 channels are not subject to signal substitution. For ease of understanding the 12 substitutable channels are channels 2–13 while the other channels are 14–61. Other combinations of channels could easily be used. FIG. 2 includes forty-eight signal inputs 125B which are shown as off-air antennas but could be satellite receivers or inputs resulting from local TV cameras or VTRs. Each signal input is at base band or is converted to base band by a respective demodulator of which demodulators 171 and 172 are shown. The base band output of each demodulator is then modulated by a respective fixed channel modulator of which modulators 174 and 175 are shown. Each of the forty-eight modulators is tuned to a different output channel so that the outputs of all modulators 174, 175 comprises the forty-eight channels 14–61. The output signals from each modulator are combined by a head end combiner 177 into a spectrum of channels 14–61. Combiner 177 splits the spectrum of channels 14–61 into three identical copies on outputs 179, 180 and 181 which are each applied to a separate two-way combiner 183, 184 and 185. The other input to combiners 183–185 consists of channels 2–13, which are subject to signal substitution. The outputs of combiners 183, 184 and 185 are the distribution trunks 142, 143 and 144, respectively.

FIG. 2 includes twelve normal channel signal inputs 125A which, as described below, are subject to being replaced by substitute channel signals through the use of a base band switch 187. As with channel inputs 125B, channel inputs 125A are shown as off-air signals but other signal types may be used. Each channel input 125A is demodulated to base band in a respective demodulator, e.g. 189, 191, which is connected via cables 192 as an input to base band switch 187. Up to six substitute channels, at base band, are also connected from the market researchers as inputs 193 to base band switch 187. It should be mentioned that the substitute channels may also include test signals which can be switched back to the market researchers for equipment testing on outputs 194. The base band signals switched back to the market researchers on conductors 194 may also include a selected normal channel so that the substitute source can be synchronized with the normal channel before channel substitution occurs.

Base band switch 187 responds to control signals from controller 135 to selectively connect the inputs 192 and 193 to the outputs of the switch. The outputs of base band switch 187 comprise outputs 194 to the market researchers and outputs 195 which are used to complete the channel spectrum sent to subscribers via distribution trunks 142–144. To provide a complete spectrum of channels 2–61 on each distribution trunk 142–144, three fixed channel modulators for each channel 2–13 are connected to outputs 195 of the base band switch 187. In FIG. 2 modulators 161, 162 and 163 for channel 2 are all shown connected to separate outputs 195 of base band switch 187, as are modulators 168, 169 and 170 for channel 13. Three combiners 197, 198 and 199 are used to generate three channel 2–13 distribution spectrums which are respectively connected as inputs to the two-way combiners 183, 184 and 185. Each combiner 197–199 receives twelve channel inputs, one for each of the channels 2–13. In FIG. 2 combiner 197 is connected to channel 2 modulator 161, channel 13 modulator 168 and to one modulator (not shown) for each channel 3–12. When connected as described, the distribution trunks 142–144 have a channel spectrum from channel 2 to channel 61 and the content of channels 14–61 is taken substantially directly from inputs 125B and the continent of channels 2–13 is taken from switch 187.

During nonsubstitution, the cable service provider or the market researchers instruct switch 187, by means of controller 135, to connect each input signal 125A to all three of the modulators, e.g. 161, 162 and 163, for that input signal. Thus, all cable subscribers will receive all normal channels 2–61 from their connected distribution trunks 142–144. When a substitution is to occur, for example, on channel 2 for subscribers connected to the A feed, the market researchers control switch 187 to connect the normal channel 2 signal to the market researchers via paths 194 as well to the three channel 2 modulators 161, 162 and 163. The market researchers obtain synchronism information for channel 2 from the channel 2 signal which they receive on path 194. At the moment for signal substitution, the market researchers send the substitute new advertisement to an input, e.g. 193*a*, of switch 187 which is controlled to connect the input 193*a* receiving the substitute signal to the output connected to modulator 161. The exact moment of substitution is determined from the synchronism information received from normal channel 2, as is well known in the art. While the substitute advertisement is being input to switch 187 it is fed on channel 2 to all subscribers, including panelists, connected to distribution trunk 142. Those subscribers connected to distribution trunks 143 and 144 continue to receive normal channel 2 signals from inputs 125A. At the end of channel substitution, switch 187 is controlled to disconnect input 193*a* and to connect the channel 2 input signal directly from input 125A to modulator 161. During the time of signal substitution, the substitution signals are sent to approximately one-third of the cable subscribers. Given the demographic selection of which zones are connected to the distribution trunks, a proper test group of subscribers has received the substitute signals. Similarly, the subscribers connected to distribution trunks 143 and 144 have received the normal signals and can form the control group.

FIG. 2 shows a market research computer system 145 which is connected to the market research organization, the scan networks 159 of local retail stores, to the telephone network 160 for other subscriber collected information and to the controller 135. The market research computer system, which may comprise multiple computers, stores lists of the panelists connected to each of the distribution trunks 142–144. Also stored in the market research computer is data representing selected stores within each zone which represent purchases by the subscribers/consumers of that zone. During signal substitution the marketing computer is informed by the researchers, on which trunk the substitute commercial was carried. The market research computer system 145 can use this information to evaluate subscriber data collected at local retail stores.

In the description of FIG. 2, base band switch 187 has been shown to include 12 input signal 125A ports and 6 substitute signal input ports as well as 36 channel output ports and a plurality of market research output ports 194. It should be mentioned that other combinations of substitute and normal signal inputs and other numbers of channel output ports 195 can be used. Although a larger base band switch 187 would be needed, the system of FIG. 2 could include, for example, 18 input sources 125A, and 9 substitute sources 193. Such a system would require 54 (3×18) output ports 195, each with a fixed channel modulator such as modulator 170.

Figure 4:
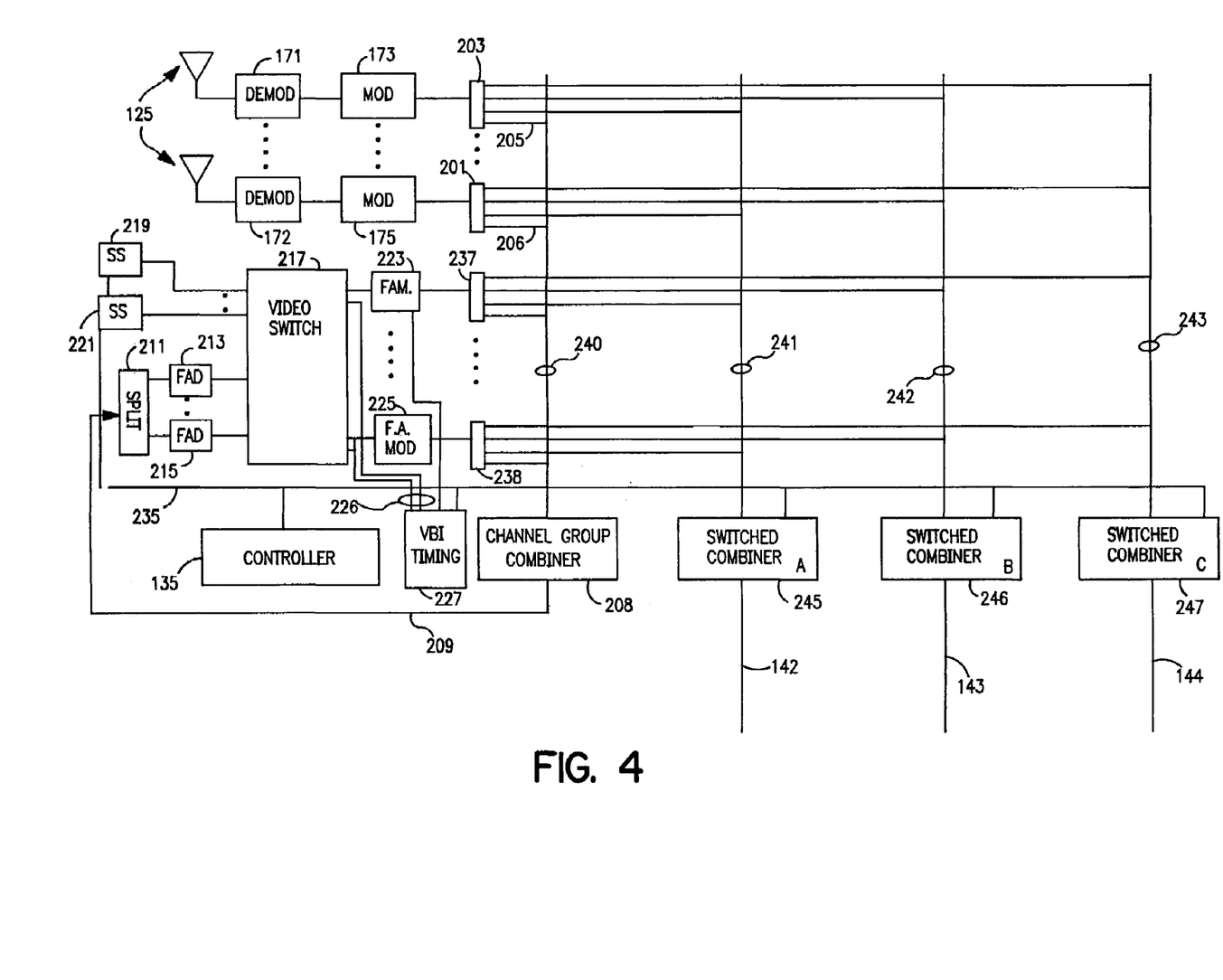
FIG. 4 is a block diagram of a second embodiment of a cable television head end.

FIG. 4 shows a block diagram of a cable head end system which may be used as an alternative to the cable head end system of FIG. 2. The system of FIG. 4 provides the three distribution trunks 142–144 each conveying a spectrum of 60 cable TV channels. The signals of any of the 60 channels may be substituted in the manner described below. 60 input signal sources 125 are used in the system to provide signals for all channels. Although the input signal sources are shown as off air antennas, they may be cable feeds, satellite receivers or VTRs, as is common in the provision of cable TV services.

The input signals from sources 125 are demodulated (171, 172) if received at rf, and each is modulated to the frequency of a unique one of the 60 channels 2–61 in respective modulators. Of the 60 modulators, only two are specifically shown, e.g., 173, 175. The output of each modulator, e.g. 173, is applied as an input to a four-way splitter, e.g. 201, 203. Accordingly, 60 four-way splitters 201, 203 are present in the system. One of the outputs of each four-way splitter is connected by rf cable to a channel group combiner 208. In FIG. 2, cable 205 connects four-way splitter 203 to group combiner 208 and cable 206 connects four-way splitter 201 to the channel group combiner. A broad vertical line 240 represents a bundle of individual coaxial cables, each conveying one modulated channel. The channel group combiner 208 thus receives 60 rf cables each conveying signals from one of the input signal sources 125 in a unique television channel. A plurality of cable channel combiners (not shown), as are well known in the art, make up combiner 208 which combines all received channels onto a single 60 channel spectrum on an rf coaxial cable 209. A signal splitter 211 receives the channel spectrum on cable 209 and splits the spectrum into a plurality of identical copies. As will be seen, the number of copies represents the number of channels on which signal substitution can be simultaneously occurring. The present embodiment allows 6 channels to be simultaneously substituted, which results in splitter 211 being an eight-way splitter with two outputs unconnected.

Each of the six active outputs of splitter 211 is connected to a frequency agile demodulator (FAD) of which 213 and 215 are shown in FIG. 4. The frequency agile demodulators receive control signals from controller 135, via a control bus 235, which determine the particular television channel they are to receive and demodulate. For example, demodulator 213 may receive from controller 135 signals defining channel 2 and demodulator 215 may receive signals defining channel 17. Thereafter, demodulators 213 and 215 demodulate the signals in channels 2 and 17 of cable 209, respectively, and apply the resulting base band signals as inputs to a video switch 217.

In the present embodiment video switch 217 is a twelve input by twelve output switch which connects signals at the input ports to output ports defined by controller 135. Six input ports are connected to the base band output signals of the frequency agile demodulators 213, 215 and six inputs are connected to base band signals from six substitute signal sources, of which sources 219 and 221 are specifically shown in FIG. 4. Six of the twelve output ports of video switches 217 are connected to frequency agile modulators (FAM) of which frequency agile modulators 223 and 225 are shown. The remaining six outputs of video switch 217 are connected by leads 226 as inputs to a vertical blanking internal (VBI) timing unit 227. VBI unit 227 identifies timing information, including vertical blanking information, from each signal on leads 226 and is interrogated from time to time by controller 135. On the basis of the synchronizing information, switching can be commanded by controller 135 during the vertical blanking interval.

Frequency agile modulators 223, 225 respond to commands received from controller 135 via bus 235 to modulate base band signals received from video switch 217 to a television channel identified in the command from the controller. For example, frequency agile modulator 223 may be commanded to generate output signals modulated to channel 2 and frequency agile modulator 225 may be commanded to generate output signals modulated to channel 17. When output signals in another channel, e.g. channel 9, are needed, new commands are sent to an available modulator, e.g. 213, to change its modulation frequency to channel 9. The output of each frequency agile modulator is applied to respective three-way splitter of which three-way splitters 237 and 238 are shown connected to modulators 223 and 225, respectively.

Figure 5:
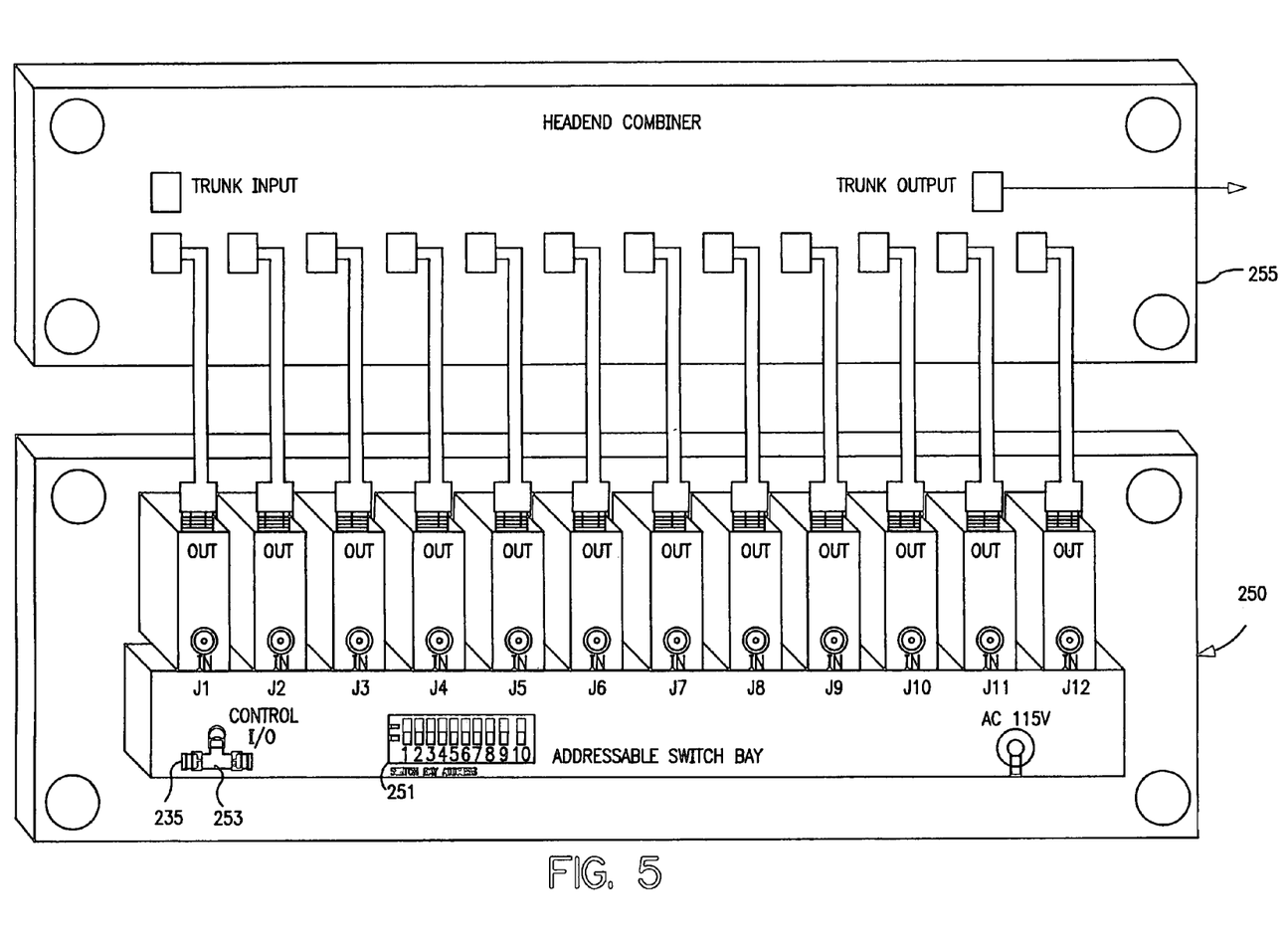
FIG. 5 shows an addressable switch bay used in the embodiment of FIG. 4.

The embodiment of FIG. 4 includes three switched combiners 245, 246 and 247, each of which is connected to receive an input cable from all 60 four-way splitters 201, 203 representing input signals and is connected to the three-way splitters 237, 238 conveying channels modulated by the frequency agile modulators 223 and 225. Thus each switched combiner 245, 246 and 247 is connected to 66 coaxial cables, each conveying signals modulated to one cable TV channel. Each switched combiner comprises 6 addressable switch bays 250, each comprising 12 single pole, single throw rf switches labeled J1–J12 in FIG. 5. The switch bay also includes an address decoder with a manually settable address 251 and a connection 253 to the control bus 235. The address decoder responds to address commands from controller 135 by turning one of the switches J1–J12 on or off as specified in the command. After a command to enter a state, a switch remains in that state until commanded to change state. The outputs of the switches J1–J12 are connected as inputs to a plurality of rf combiners which are connected to produce a spectrum of TV channels 2–61 on a distribution trunk, e.g. 142. As shown in FIG. 4, the switched combiners 245, 246 and 247 generate a spectrum of TV channels on distribution trunks 142, 143 and 144, respectively.

The spectrum of channels applied to any of distribution trunks 142, 143 and 144 is determined by the individually addressable switched combiners 245, 246 and 247. When only normal channels from input signals 125 are to be sent on distribution trunk 142, switched combiner 245 receives addressed commands from controller 135 to turn on all 60 switches connecting the input signal sources 125, via their respective channel modulators, to the distribution trunk. The other switches of switched combiner 245 are turned off. When a signal is to be substituted in a given channel on distribution trunk 142, switched combiner 245 is commanded to switch the given channel from input signals 125 off and the substitute signal from video switch 217 (in the given channel) on. Controller 135 performs such switching on and off during the vertical blanking interval as identified by vertical blanking interval timing unit 227.

The following illustrates the delivery of substitute signals in channel 17 on distribution trunk 142. Initially, all channels on distribution trunk 142, including channel 17, are selected by switched combiner 245 from the input sources 125. At a time prior to actual substitution, controller 135 sends to an available frequency agile demodulator, e.g. 215, a command specifying channel 17 and sends to an available frequency agile modulator, e.g. 225, a command also specifying channel 17. Controller 135 also sends to video switch 217 a command directing that the switch input of frequency agile demodulator 215 be switched to the switch output of frequency agile modulator 225. After frequency agile demodulator 215, video switch 217 and frequency agile modulator 225 have responded, a copy of the channel 17 signals from input source 125 is available at the output of three-way splitter 238 and at an input of vertical blank timer unit 227. Switched combiner 245 is then commanded during a vertical blanking interval to turn off the switch J1–J12 connected to the channel 17 input signal source 125 and to turn on the channel 17 input from three-way splitter 238. At this point, channel 17 is delivered to the subscribers connected to distribution trunks 143 and 144 directly from the input source 125 and channel 17 is delivered to the subscribers connected to distribution trunk 142 via the channel group combiner 208 and video switch 217. When the time for signal substitution occurs, as is recognized by an operator at the market researcher, substitute signal source, e.g. 219, is started and controller 135 commands video switch 217 to connect the switch input of signal source 219 to the output connected to frequency agile modulator 225. At the same time the prior connection between frequency agile demodulator 215 and frequency agile modulator 225 is broken. This removes the normal signals from channel 17 on distribution trunk 142 and replaces them with the substitute signals from source 219. During the time of signal substitution the substitute signal from source 219 will be available on distribution trunk 142. At the conclusion of the substituted signal, the video switch 217 is commanded to reconnect frequency agile demodulator 215 to frequency agile modulator 225 so that the continuing normal signal of channel 17 will be connected to distribution trunk 142. When all substitution for channel 17 is completed, switched combiner 245 is commanded to turn off the channel 17 connection from the video switch 217 and to turn on the channel 17 signal from the input sources 125.

Figure 6:
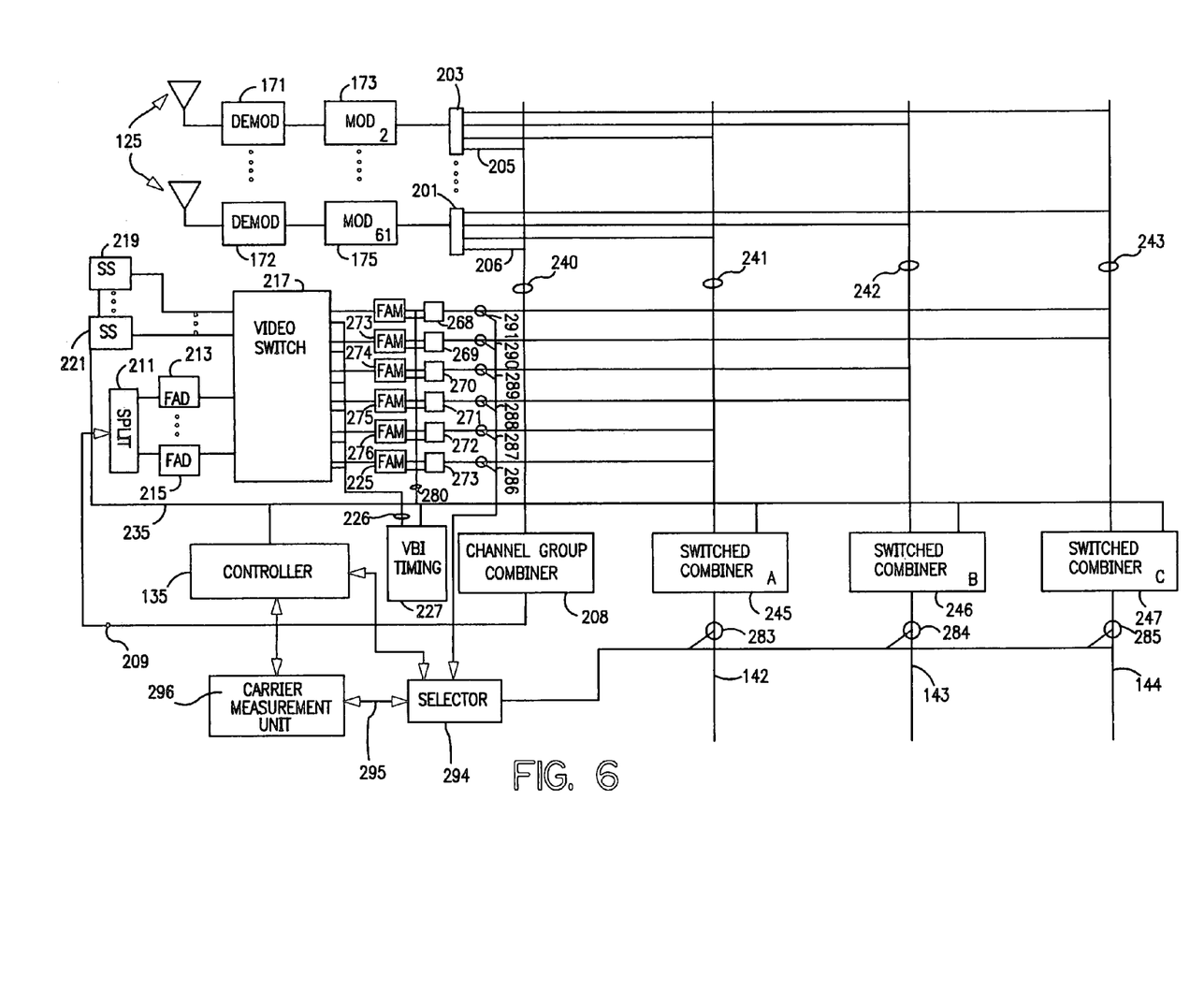
FIG. 6 is a block diagram of a third embodiment of a cable television head end.

FIG. 6, which comprises an alternative embodiment for the cable head end, is largely the same as FIG. 4. With the system of FIG. 6, each switched combiner 245, 246 and 247 is directly connected to two of the frequency agile modulators, e.g. 223 and 275. That is, the output of each frequency agile modulator is not split into three copies and applied to all switched combiners as is done in the embodiment of FIG. 4. In the system of FIG. 6, only two channels can be simultaneously substituted on each of the distribution trunks 142, 143 and 144 and, when a signal is to be substituted on each of the distribution trunks 142, 143 and 144, a switch path must be set up through video switch 217 to a frequency agile modulator, e.g. 223, 225 and 276 connected to the distribution trunk.

When replacing one channel signal with another, it is desirable that both signals are of similar level so that subscribers will not be aware of the substitution. FIG. 6 includes signal sampling and amplitude control apparatus to correct signal level mis-matches. Signal levels and gains throughout the system are controlled by fixed means so that the signal levels from four-way splitters 201 and 203 are lower than the signal levels from frequency agile modulators 223, 225 and 275–278. An electronically controlled attenuator 268–273 serially connects the output signals from the frequency agile modulators to their respective switched combiners 245–247. Control for the attenuators 260–273 is sent by controller 135. The signals on each distribution trunk 142–144 are split by splitters 283–285, respectively, and communicated to a selector 294 which also receives signals representing the outputs of attenuators 268–273 which are taken by a plurality of splitters 291–286, respectively. Selector 294 comprises a selector switch having 9 inputs, one from each splitter 283–291, and one output 295. A carrier measurement unit, which includes a controllable tuner and a carrier amplitude measurement unit (not shown), is connected to the output 295 of selector 294.

When signals are about to be substituted, controller 135 directs selector 294 to connect a particular distribution trunk, e.g. 142, to carrier measurement unit 296 and directs the tuner of carrier measurement unit 296 to tune to the particular channel to be substituted. The level of the carrier is then measured and signals representing that measurement are returned to controller 135. Similarly, selector 294 is controlled to connect the substitute channel splitter, e.g. 291, to the carrier measurement unit 296. Carrier measurement will occur at the same channel carrier frequency as was measured from trunk 142. The two measurements are compared by controller 135 which then directs via bus 235 the relevant attenuator, e.g. 268, to attenuate the signals at the output of frequency agile modulator 223 to the same level as those sensed on trunk 142. Thereafter, the attenuation level provided at attenuator 268 will remain the same until a new substitution is proposed. It should be mentioned that the signal matching capabilities shown and described with respect to FIG. 6 are easily applied to the embodiments of FIGS. 2 and 4.

Figure 7:
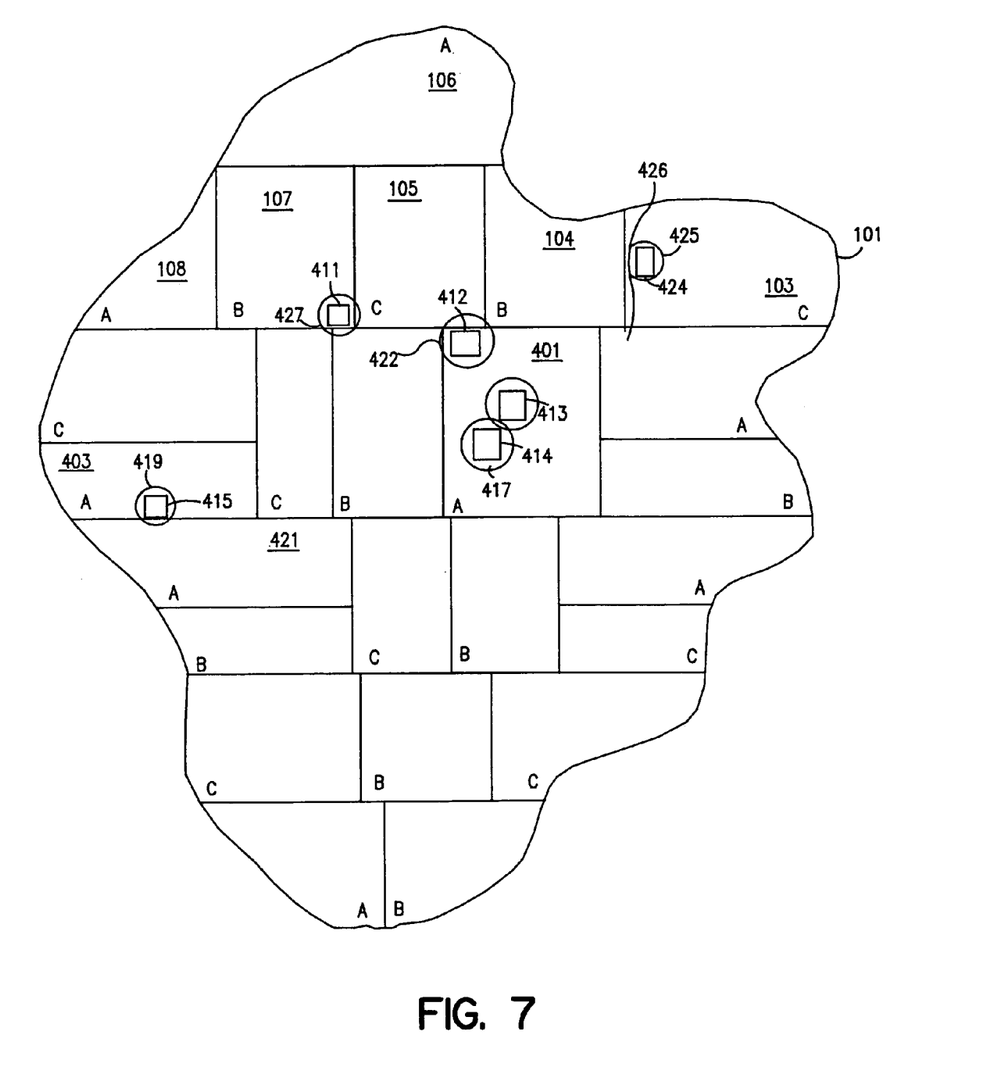
FIG. 7 shows the community of zones of FIG. 1 further including representation of stores within the zones.

In the preceding embodiments, identifiable panelist shopping data is collected and analyzed to determine the effectiveness of substitute advertising presented in the zones in which the panelists reside. Meaningful results can also be obtained by the analysis of other, non-panelist, information in accordance with the invention. FIG. 7 represents the viewer community 101 as previously shown and discussed. In FIG. 7 the signal distribution points, e.g. 151, 152 and 153, have been removed and each zone includes a letter A, B or C indicating from which distribution trunk 142, 143 or 144 the zone receives television signals. The distribution of television signals is the same as described above and shown in FIG. 1.

As described regarding FIG. 1, consumer data and data about the demographics of the viewer community is analyzed and the assignments of cable feeds, e.g. 109, FIG. 1, to zones determined and appropriate connections are made. After making such connections all zones labeled A receive the same distributed television signals, all zones labeled B receive the same distributed television signals, and all zones labeled C receive the same distributed television signals. In the present description, all zones having the same letter designation are said to make up a cell. For example, cell A includes all of the zones having an A designation.

After the zones are established and it is known of which cell each is a part, consumer purchase data collection points must be established. The data collection points selected for this type of survey and analysis are collection points in stores having a majority of shoppers who are also viewers from the same cell. FIG. 7 shows a plurality of representative data collection points 411–415. In a total system, many more data collection points would be identified. These data collection points may be, for example, product scanners and their associated computer systems located in retail sales stores. One way of selecting appropriate data collection points is to accurately place the location of the collection point within a map of the geographic zone and draw a perimeter, e.g. 417, to represent a shopping area about the collection point. Such perimeter may have, for example, a radius of one mile. When the perimeter is entirely within a single zone it is reasonable to believe that a majority or preponderance of shoppers to that data collection point will come from that zone. A perimeter which crosses a zone boundary may still meet the qualifications for selection. For example, collection point 415 in zone 403, an A zone, has a perimeter 419 which crosses a zone boundary, however, zone 421 into which it crosses is also an A zone. Accordingly, data collection point 415 may be selected because the perimeter is entirely within the A cell. Data collection points such as 411 and 412 may not meet the established criterion. The perimeter 427 of data collection point 411 extends into two B zones and two C zones and it is possible that a majority of shoppers are not from the same cell. It should be mentioned, however, that if substitute advertizing were broadcast to cell A, the data collection point 411 might be appropriate for use as a control since its entire perimeter 421 is in cells B and C, which did not receive the special advertizement. Data collection point 412 is likely unusable for any testing since its perimeter 422 crosses into all three cells.

In the above, the perimeters are drawn as circles around the data collection points. The topology of the viewer community may be considered when data collection points are chosen. Zone 103 includes a data collection point 424 which is relatively near a zone boundary but is separated therefrom by a natural barrier such as a river 426. In this case the data collection point 424 may be acceptable because few shoppers travel from zone 104 (a B zone) to shop at the store due to the barrier.

The selection of data collection points must be considered so that each cell, e.g. A, should be represented by data collection points which are substantially matched by data collection points in the other cells B and C. That is, the type of stores including the data collection points should be considered when laying out a test analysis. Should a test call for the analysis of purchases at upscale stores, upscale data collection points should be available in each cell. Similarly, when a test calls for the analysis of discount store sales data, discount store data collection points should be available in each cell.

After the data collection points are selected they are each assigned a unique identifier so that data from each can be identified. The market research computer 145 is then updated with a list of the selected data collection point identifiers, their demographic type and the particular cell which each is chosen to represent. When purchase data is collected by a product data collection point, a message is created which includes the identifier of the data collection point and the purchase data. When the market research computer 145 reads the message, it can identify the cell associated with the data collection point from the unique identifier.

After the data collection points have been selected and their individual attributes analyzed, the market research group can properly design significant tests for the viewer community. If a new grocery product advertisement is to be tested, a substitute advertisement may be prepared and played in one cell, e.g. A, while the other cells B and C will receive a normal older advertisement. Upon running the substitute and normal advertisement, the market research computer 145 begins to collect relevant consumer purchase data from the data collection points. The received data is sorted on the basis of which cell the data is associated with and the market significance of the substitute advertisement may be evaluated by statistically comparing the results for cell A with the results from cells B and/or C.

Not all consumer behaviors can be completely analyzed by data accumulated at consumer data collection points. For example, when a marketing test is undertaken to evaluate responses to a substitute advertisement for a telephone service, the consumers may phone in or write in to purchase the service. That is, they may not go to data collection points to complete a transaction or there may be so few data collection points in the community that they cannot be individually associated with zones. An example of the latter situation occurs when completion of a sales transaction involves calling a single telephone number for all members of the community. An additional procedure can be employed to collect customer purchase data when the data collection points might not yield results. This additional procedure does not require data collection points or that consumers enroll as panelists in order to provide market test data.

With the additional procedure, a consumer parameter is identified and a zone is then associated with each parameter. The consumer parameter may, for example, be the telephone numbers of the consumers in the community. From the telephone numbers, the market research organization can prepare a data file associating each telephone number with the zone including the telephone number. This data file is then stored in the computer system of the market researcher. After a test program substitution has occurred, a survey, such as a person-in-the-street or telephone calling survey, can be undertaken to identify and associate the telephone numbers of particular consumers and any relevant purchase behavior. The data collected in the survey can then be analyzed in the computer system to identify from the consumers' telephone numbers, the zone associated with them, and evaluate the purchase data by statistically comparing the purchase behavior of consumers associated with one zone (or cell) with the purchase behavior of consumers associated with other zones (or cells).

Consumer telephone numbers are only one of many possible parameters which may be used in the survey type of data collection. The consumer's name could also be used as a parameter which is associated with the zone in which the consumer lives. In this case, a data file associating consumer names and the zones in which they live could be stored in the market research computer system for later analysis of survey collected purchase data. Similarly, the consumers' addresses could be used as the consumer parameter and a data file associating consumers' addresses with zones could be stored in the computer system for use in later analysis of survey collected data.

In the preceding embodiments, demodulators 171, 172, 189 and 191 may be, for example, Scientific Atlanta Demodulator No. 6250, and may include necessary receiving apparatus as is well known in the art. Modulators 161–163, 168–170, 173 and 175 may be, for example, No. 6350 by Scientific Atlanta. The video switches 217 and 187 may be Dynair System 21 routing switches configured with the required number of input and output ports. Also, the embodiments describe systems having an exemplary number of cable channels and substitutable channels and signal sources. The number of channels and signal sources are discussed by way of example and are not limited to those described. The preceding description relates to specific examples of systems embodying the present invention. The described systems can be modified by persons of ordinary skill in the art without departing from the spirit and scope of the present invention which is defined by the claims attached hereto.

What is claimed is:

1. A consumer response analysis system comprising:
  a targetable television system including a head end, a signal distribution arrangement and a plurality of television receivers for viewing by consumers, said head end including circuitry for transmitting normal television program signals and substitute television program signals on a plurality of distribution trunks connected by the signal distribution arrangement to said plurality of television receivers, each television receiver being connected to the plurality of distribution trunks preselected so that the receivers connected to at least one of the distribution trunks demographically represents the community for market research purposes, the head end including signal distribution circuitry for receiving the normal television program signals and the substitute television program signal and for combining the received channel signals into spectrums of channels on the plurality of distribution trunks, the spectrum of channels on less than all of the plurality of distribution trunks including the substitute television program signal;
  a plurality of product sales collection units each for collecting information representing purchases by the consumers at one of a plurality of stores and for generating product identifying signals identifying the products purchased and the sales collection unit collecting the information, each sales collection unit predominately collecting purchase information by consumers viewing receivers connected to the Same distribution trunk, whereby the system is closed between the targetable television system and the product sales collection units by the acts of the consumers viewing the programs presented on the respective television receivers and shopping in a store including a sales collection unit; and
  a market research computer system including data for identifying the particular sales collection units associated with each of the distribution trunks and responding to said transaction response signals to provide an indication of consumer behavior in response to said normal and substitute programs.

2. A consumer response analysis system in accordance with claim 1 comprising controller apparatus for controlling signal substitution on the distribution trunks and for identifying such substitution to the market research computer system.

3. A consumer response analysis system in accordance with claim 2 wherein the consumers are distributed throughout a viewer community and the distribution means comprise means for splitting the signals on each distribution trunk into a plurality of substantially identical copies and for conveying the signal copies by fiberoptic means to geographically grouped consumers.

4. A consumer response analysis system in accordance with claim 3, wherein each sales collection unit is located in a-store shopped predominately by consumers from one of the geographic areas.

5. A method for use in a consumer response analyzing system comprising apparatus for distributing television programming to a plurality of zones in a community of consumers and consumer data collection points located in stores in the zones for collecting consumer purchase data, the method comprising:
  associating one of the zones with each consumer data collection point, said association, being made when a majority of purchases at a particular data collection point are made by consumers from one of the zones;
  assigning each consumer data collection point aunique identifying address;
  presenting television programming to the community so that a substitute program is presented to the consumers in a first set of zones and normal programming is presented to consumers in a second set of zones;
  accumulating consumer purchase data from the consumer data collection points along with the identifying address of each consumer data collection point providing accumulated consumer purchase data; and
  analyzing the collected data of the consumer data collection points identified as being associated with a zone receiving the substitute program and the collected data identified as being associated with a zone receiving the normal programming to identify the market significance of the substitute programming.

6. A method in accordance with claim 5 comprising:
  identifying consumer data collection points in the community which are located in stores where a majority of the purchases are made by consumers from one of the zones; and
  storing in a computer memory information associating the consumer data collection points identified in the identifying step with the zone including the consumers making the majority of purchases.

7. A method in accordance with claim 6 comprising storing in the computer, demographic data describing the type of a store in which each consumer data collection point is located, and wherein the analyzing step comprises identifying market significance based in part on the computer stored demographic data.

8. A method in accordance with claim 7 comprising only data accumulated from consumer data collection points located in stores having similar demographic data description.

9. A television distribution and analysis system for delivering a plurality of channel signals in separated TV channels to a plurality of cable television subscribers residing in a geographic area comprising:

a plurality of normal channel signal sources for producing normal TV channel signals to be delivered to subscribers;

a source of a substitute channel signal to be substituted for at least one normal channel signal;

signal distribution circuitry for receiving the normal channel signals and the substitute channel signal and for combining the received channel signals into spectrums of channels on a plurality of distribution trunks, the spectrum of channels on less than all of the plurality of distribution trunks including the substitute channel signal; and apparatus for generating a plurality of substantially identical copies of the spectrum of channels of each distribution trunk;

apparatus for connecting the substantially identical copies of the channel spectrum of each distribution trunk to different substantially contiguous zones of the geographic area;

a plurality of customer purchase data collectors for collecting customer purchase data in stores of the geographic area, each customer purchase data collector representing purchases made by subscribers residing in one of the zones; and a data analysis computer system for accumulating customer purchase data from the data collectors and for analyzing the collected data to identify the market significance of the normal and substitute channel signals connected to the zones of the geographic area.

10. The television distribution and analysis system of claim 9 wherein each customer purchase data collector is located in a store a majority of whose purchasers are subscribers in one of the zones and the data analysis computer comprises memory for storing for each customer purchase data collector, the identity of the zone including the collector.

11. The television distribution and analysis system of claim 9 wherein the apparatus for connecting connects the spectrum of channel signals from one of the distribution trunks to zones of the community separated from one another by zones connected to others of the distribution trunks and selected to demographically represent the community for market research purposes.

12. A television distribution and analysis system in accordance with claim 9 wherein the zones connected to at least one distribution trunk are selected to demographically represent the community for market research purposes.

13. A television distribution and analysis system in accordance with claim 9 wherein the connecting apparatus comprises fiber optic apparatus for connecting the substantially identical copies of the channel spectrum of each distribution trunk to different ones of the zones.

14. A television distribution and analysis system in accordance with claim 9 comprising a plurality of first signal combiners equal in number to the number of distribution trunks each first signal combiner receiving as inputs first channel modulated normal signals for which no signal substitution is performed and second channel modulated signals including normal signals and at least one substitute signal.

15. A television distribution and analysis system in accordance with claim 14 comprising:

a video switch apparatus for receiving as inputs, normal channel signals and substitute channel signals and for selectively connecting the input signals to a plurality of output ports of the video switch; and circuitry for combining the signals at the output ports into a plurality of cable television channel spectrums equal to the number of distribution trunks.

16. A television distribution and analysis system in accordance with claim 15 comprising a plurality of channel modulators each connected to an output of the video switch, the channel modulators comprising a number of modulators equal to the number of distribution trunks for each channel of the second channel modulated signals.

17. A television distribution and analysis system in accordance with claim 9 comprising:

a video switch apparatus for receiving as inputs, normal channel signals and substitute channel signals and for selectively connecting the input signals to a plurality of output ports of the video switch; and circuitry for combining the signals at the output ports into a plurality of cable television channel spectrums equal to the number of distribution trunks.

18. A television distribution and analysis system in accordance with claim 17 comprising a plurality of channel modulators each connected to an output of the video switch.

19. A television distribution and analysis system in accordance with claim 9 comprising:

a plurality of first signal conductors each for conveying a single channel modulated normal television signal;

at least one second signal conductor for conveying a single channel modulated substituted television signal; and a switched combiner means connected to receive signals from the first signal conductors and the second signal conductor for selectively connecting signals from predefined ones of the first and second signal conductors to the distribution trunks.

20. A television distribution and analysis system in accordance with claim 19 wherein the switched combiner unit comprises a switched combiner for providing signals to each of the distribution trunks.

21. A method for use in a consumer response analyzing system comprising apparatus for distributing television to a plurality of substantially geographically contiguous zones in a community of consumers and a market research computer system, the method comprising:

identifying a consumer parameter of consumers in the community and associating one of the zones of the community with the consumer parameters of a plurality of consumers; storing in the market research computer system data representing the associations between consumer parameters and zones;

presenting television programming to the community so that a substitute program is presented to the consumers in a first set of zones and normal programming is presented to consumers in a second set of zones, the presenting step being performed after the preceding data storing step;

conducting a survey of a plurality of consumers throughout the community after the presenting step to identify their customer parameter and to identify consumer purchase data; and analyzing the survey identified data in the market research computer system to associate each consumer purchase data with one of the zones to identify the market significance of substitute programming.

22. A method in accordance with claim 21 comprising:

identifying consumer telephone numbers as consumer parameters and associating each identified consumer telephone number with the zone including that telephone number; and storing in the market research computer system data representing associations between consumer telephone numbers and the zones including the identified telephone numbers.

23. A method in accordance with claim 21 comprising:

identifying consumer addresses as consumer parameters and associating each identified consumer address with the zone including that consumer address; and storing in the market research computer system data representing associations between consumer addresses and the zones including the identified consumer addresses.

24. A method in accordance with claim 21 comprising:

identifying consumer names as consumer parameters and associating each identified consumer name with the zone including that consumer name identified; and storing in the market research computer system data representing the associations between consumer names and the zones including the identified consumer names.

* * * * *

UNITED STATES PATENT AND TRADEMARK OFFICE
CERTIFICATE OF CORRECTION

PATENT NO. : 6,941,573 B1
DATED : September 6, 2005
INVENTOR(S) : Thomas M. Cowan et al.

It is certified that error appears in the above-identified patent and that said Letters Patent is hereby corrected as shown below:

Column 16,
Line 17, change "a-store" to -- a store --;
Line 29, "aunique" to -- a unique --; and Column 18,
Line 46, after "consumers;" begin a new paragraph.

Signed and Sealed this

Fourteenth Day of March, 2006

JON W. DUDAS
*Director of the United States Patent and Trademark Office*